Aug. 12, 1947.  W. A. ANDERSON  2,425,451
FRONT FEED MECHANISM FOR WRITING MACHINES
Filed June 11, 1946   2 Sheets-Sheet 2
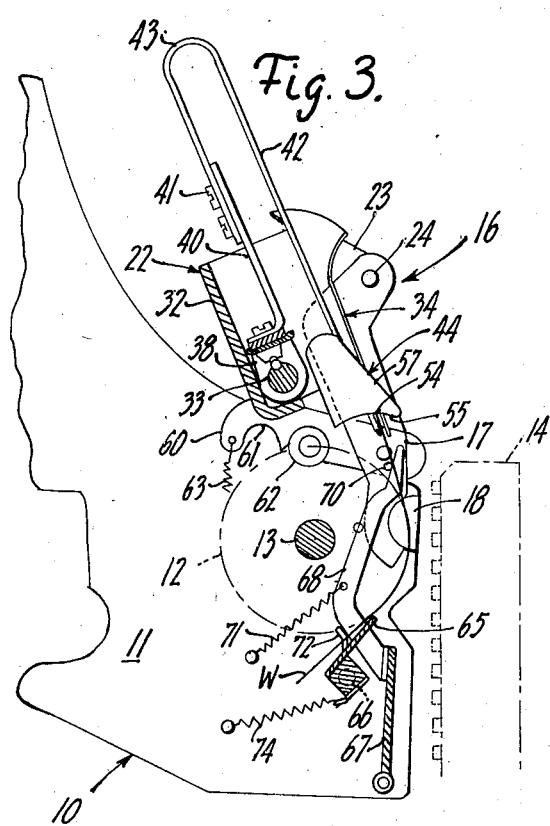
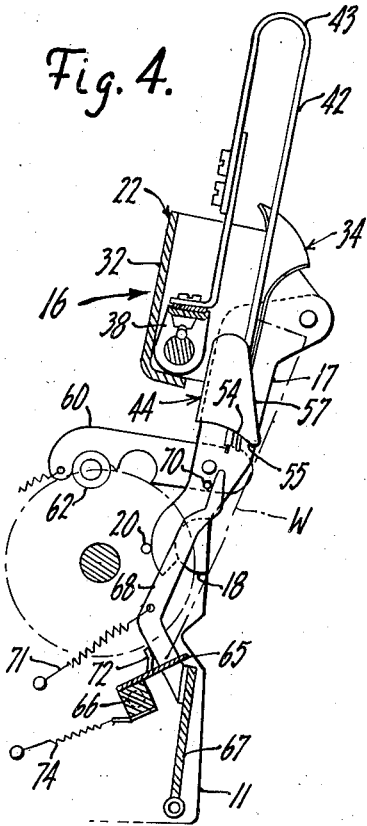
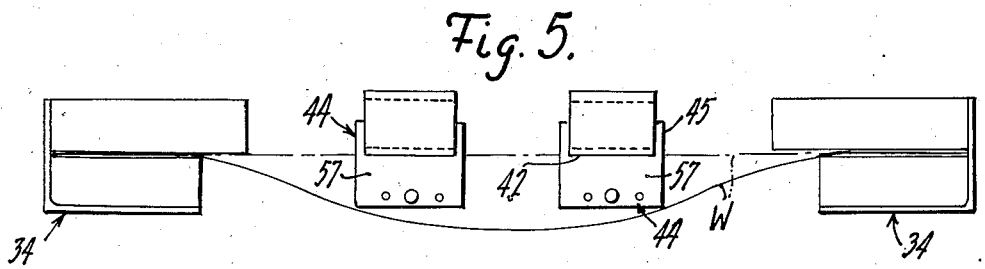
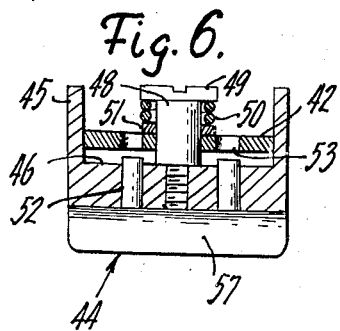
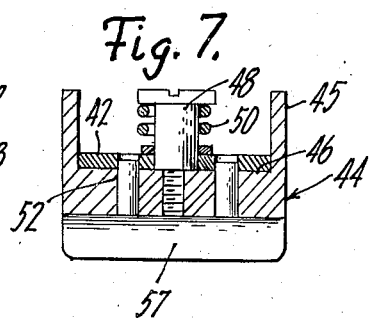
INVENTOR
WALTER A. ANDERSON
BY
ATTORNEY Patented Aug. 12, 1947

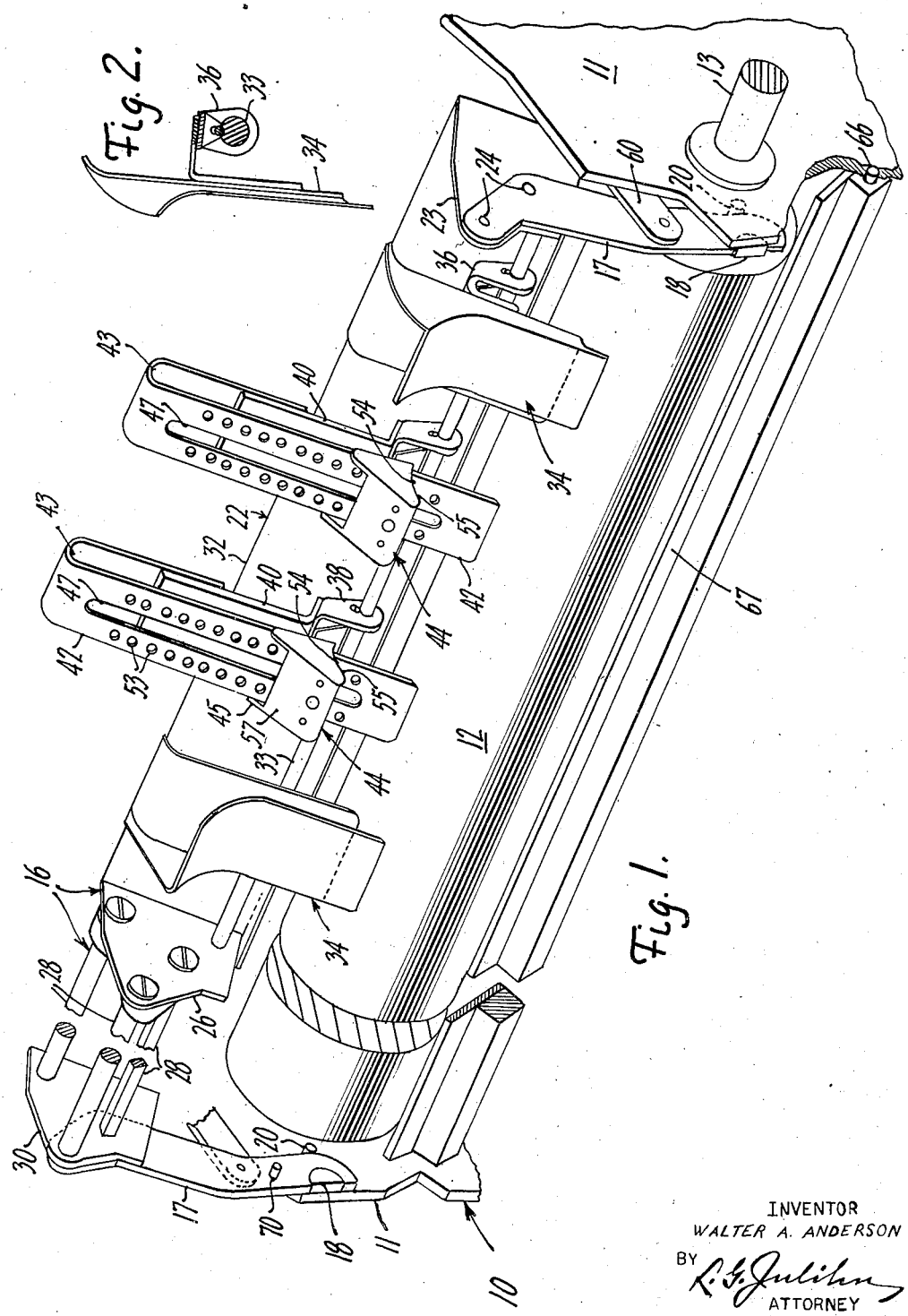

2,425,451

UNITED STATES PATENT OFFICE 2,425,451

FRONT FEED MECHANISM FOR WRITING MACHINES

Walter A. Anderson, Bridgeport, Conn., assignor to Underwood Corporation, New York, N. Y., a corporation of Delaware Application June 11, 1946, Serial No. 675,956

6 Claims. (Cl. 197—127)

This invention relates to record-preparing machines in general, and more particularly to means in such machines to facilitate introduction of work-sheets to predetermined record receiving positions.

In certain accounting systems it is the practice to prepare at specific time intervals, a single-line account record in a predetermined line position on a record sheet, such account record giving a summary of the business transacted during the concluded time interval.

After each of said intervals, a new line-entry is made on the record sheet, upon a succeeding, predetermined line position.

Because record sheets of this nature require repeated handling, they are usually made of relatively firm paper.

It is an object of the instant invention to provide in a record preparing machine, such as an accounting machine, efficient, economical means to facilitate placement of work-sheets for reception thereon of recordings at predetermined positions, for example, to satisfy efficiently the record-making practice outlined hereinabove.

It is another object of the invention to provide in conjunction with means for guiding or feeding work-sheets to a recording station on a machine, efficient means whereby to locate the work-sheets at a desired, predetermined record-receiving position.

It is a further object of the invention to provide top-edge sheet-gaging means for work-sheets in efficient cooperative association with guiding means for front-feeding work-sheets to a record-making machine, particularly to facilitate expeditious and convenient work-sheet handling.

Another object is to provide efficiently and conveniently adjustable sheet-gaging means for positioning a work-sheet variably at different record-receiving positions.

With these objects in view, the invention includes certain novel features of construction and combination of elements, the elements of which are set forth in the appended claims, and a preferred form or embodiment of which is hereinafter described with reference to the drawings which accompany and form part of this specification.

Referring now to the drawings:

Figure 1 is a right-hand perspective view of a Sundstrand accounting machine carriage embodying the features of the invention.

Figure 2 is a right hand side view of a worksheet guide together with supporting means therefor.

Figures 3 and 4 are left hand sectional side elevations taken between two top-edge gages through the carriage, the figures showing the carriage respectively conditioned for typing and front-feeding.

Figure 5 is a diagrammatic plan view of top-edge gaging means in novel association with worksheet guides.

Finally, Figures 6 and 7 are sectional plan views of an adjustable top-edge gage respectively being in the process of adjustment and in locked adjustment on a bar.

The invention has been embodied in the conventional Sundstrand accounting machine, and, directing now attention to the drawings, a general reference numeral 10 designates the carriage of such machine with the present improvements embodied therein. Said carriage comprises two end-walls 11, wherebetween there extends a platen cylinder 12 which by means of a shaft 13 is journaled therein. The end-walls 11 of the carriage are fast on a usual track member, not shown, for movement of the carriage on a main frame of the machine to present different writing portions of the platen opposite a set of type-bars 14, one of the latter being indicated in Figure 3 in dot-and-dash lines in a raised, printing position.

Upon the end-walls 11 of the carriage there is mounted a front-feed structure, generally designated by the reference numeral 16, and including two widely spaced arms 17 which have pivotal support about the center of half pintles 18 that reach inwardly from the opposite carriage walls 11. Pins 20 are cooperative with said arms 17 along faces that are concentric with said pintles, in a manner to keep said arms 17 in pivotal association with the pintles.

The entire front-feed structure 16 is normally in an out-of-way position with regard to the operating range of the type-bars 14, see Figure 3 and also Figure 1.

The aforesaid front-feed structure 16 includes connecting means between the two arms 17, comprising, a frame 22 struck up from sheet-metal, having a right hand flange 23 fastened to the right hand arm 17, as at 24, by means of rivets or otherwise, and having also a left hand flange 26. The latter flange is connected by means of several tie-rods 28 with a plate 30 that is rigid with the left hand arm 17 of the front-feed structure. The two flanges 23 and 26 are integral with a connecting web 32 of angular cross-section, together with which they constitute said sheet-metal frame 22. It will thus be seen that the entire front-feed structure 16 comprises a unitarily pivoted identity that is normally in a rearwardly position, away from the operating range of the type-bars 14.

Extending between the flanges 23 and 26 of the sheet-metal frame, and rigidly fastened thereto is a rod 33 whereon there are carried for adjustment therealong, a left and a right paper guide numbered 34. Said paper guides 34 are in the form of generally upright channel members facing toward one another and constituting together a chute for directing a work-sheet, such as indicated by the reference character W, to printing position. These channel members are formed of sheet-metal and are preferably open-mouthed on top as shown. They are adjustably carried upon the rod 33 by means of brackets 36 which are splined for ready adjustment along the rod in a manner that is conventional, and against moderate frictional resistance.

Intermediate the brackets 36 there are two other brackets 38 on the rod 33 which have up-reaching extensions 40 whereto there are fastened, as by screws 41, flat-stock bars 42 to rise upwardly therefrom and to double downwardly from points 43 with considerable clearance from the brackets 38, and behind the work-sheet guiding plane in which the guides 34 lie. Said flat-stock bars 42 carry each a top-edge gage-block 44 which is adjustable to different elevations therealong.

The brackets 38 are adjustable along the rod 33 against frictional resistance, the same as the brackets 36. Each gaging block has opposite walls 45 flanking and extending well to the rear of the side-edges of the bar 42, a rear face 46 of the block being normally contacting the front of the bar. As clearly seen in Figure 1, each bar 42 is provided with a slot 47 extending longitudinally therein. Extending through this slot and fastened to the gage-block is a shouldered screw 48 having an enlarged head 49. On this screw, between the head 49 and the rear of the bar 42 there is contained a compression spring 50 and a washer 51, said spring providing tension to draw the gage-block 44 resiliently against the front of the bar 42. Each gage-block also carries two pins 52 which project rearwardly therefrom to provide protuberances for toothed engagement in perforations 53 provided in the bar 42 along both slides of the slot 47. It will thus be seen that the gage-blocks 44 are adjustable to different definite locations or elevations along the bar 42, it being merely required to pull the gage-blocks forwardly, to slide them along the bar, and to allow them to locate with reference to desired pairs of perforations. The said gage-blocks 44 project well forwardly across the plane in which the marginal portions of work-sheets are adapted to be guided by said paper guides 34. They afford underneath thereof a top-edge gaging face 54 which extends forwardly from the supporting bar 42, and which ends in a pronounced downward dip 55 at the front for a purpose to be brought out later. The top of the gage-block 44 is downwardly and forwardly sloping as at 57, for a purpose also yet to be brought out.

The illustrated chute comprised by the paper-guides 34 accommodates a relatively narrow work-sheet, and it will be seen that the supporting sheet-metal frame 22 need only extend partly along the carriage. The section of the carriage to the left thereof may accommodate another work-sheet, such as a rear-fed sheet, and in some instances may not be required.

As has been stated hereinbefore, the front-feed structure is normally in an out-of-way position of the type-bars. When it is desired to introduce a work-sheet W down the chute comprised by the two paper guides 34, said front-feed structure is preferably tilted forwardly about the said pintles 18 to said Figure 4 position. For detenting the front-feed structure in its said two positions, there is connected to the right-hand arm 17 of said structure a detenting link 60 having notches 61 for alternate engagement with a roller 62 on the adjacent end-wall of the carriage. Said detenting link is under constant downward pressure of a spring 63 to give it yielding detenting action.

Referring to Figure 4, a work-sheet W to be introduced is moved downwardly into the channel guides 34 and as the lower portion thereof encounters the gaging blocks 44, it will be bowed forwardly between the guides 34, as indicated in full lines in Figure 5, due to camming contact of the sheet with the sloping face 57 of the block. The work-sheet assumes below the gage blocks gradually again a transversely straight condition and finally enters a front-feed throat intermediate a front-feed lip 65 and the platen. See Figure 4. Said front-feed lip is pivoted in the opposite carriage ends as at 66 and, as shown in Figure 4, is capable to direct the paper in a flat curve rearwardly underneath the platen. The work-sheet is pushed down until its top edge has passed the gaging blocks. It will be noted from the full-line representation of the work-sheet W in Figure 5 that the work-sheet is contacted by the rear-faces of the forward walls of the channel guides 34 while the work-sheet intermediate the plane of said faces is bowed forwardly by the gage blocks. The instant the upper sheet-edge passes the front-apexes of the gaging blocks, is apparent to the operator inasmuch as the sheet will then flex rearwardly to the position indicated in Figure 5 by dot-and-dash lines. The work-sheet is then pulled up against the gaging faces 54 in close proximity to the bars 52. The downward dip 55 of the gaging face 54 thereupon keeps the upper end of the work-sheet in a straight condition between the two guides 34, in opposition to a tendency of the work-sheet to flex forward, particularly, when the front-feed structure 16 is restored.

Conventional mechanism is provided to move the front-feed lip 65 to a closed and open throat position, respectively as the front-feed structure 16 is moved to its normal out-of-way position of Figure 3, and as it is moved to its front-feed position of Figure 4. This lip moving mechanism comprises a member 67 extending intermediate the two carriage ends 11 and having pivotal support thereon. From said member 67 there reaches upwardly at each end of the carriage an arm 68 to the front of a pin 70 which projects laterally from the adjacent arm 17 of the front-feed structure. Springs 71 pulling rearwardly on said arms 68, cause the composite structure 67—68, controlled by the pins 70, to swing forwardly and backwardly respectively as the front-feed structure 16 is moved to the Figure 4 and to the Figure 3 positions.

The front-feed lip 65, under the tension of a spring 71 is constantly urged to assume the open-throat position seen in Figure 4. However, ears 72, having rigid connection with the lip 65, are in controlling contact with the rear of the arms 68, so that the front-feed lip will move to the opened and closed throat positions illustrated in Figures 4 and 3, when the composite structure 67—68 is moved respectively forwardly and rearwardly under the control of the front-feed structure.

Whenever the work-sheet has been front-fed and its top edge gaged against the face 54, the combined action of swinging the front-feed structure rearwardly and swinging the front-feed lip 65 towards the platen, causes the work-sheet to be bent and bound to the platen around the frontside of the latter. In the execution of this operation, the downward dipping extension 55 of the gaging face 54 is instrumental to keep the work sheet substantially in a straight plane between the two side guides 34, and bent rearwardly of the type-bars 14.

The described organization of elements is simple, conveniently adjustable for different width forms and line positions, and facilitates introduction and withdrawal of forms at great speed and with utmost accuracy.

It is not essential to the invention that the paper guides 34 and the top-edge gages 44, be part of a displaceable front-feed structure, although its displaceability in certain machines or work is of added value. Use of two top-edge gages 44 is advantageous in that it facilitates proper squaring of the work-sheet, but, obviously one gage 44 may be satisfactory in many instances.

It is to be understood that the invention is susceptible of modification and change without departing from the general purposes and objects of the invention brought out hereinabove.

What is claimed is:

1. In a record preparing machine, a work-sheet guiding means to facilitate movement of a worksheet to a desired position on the machine, said guiding means comprising guiding surfaces in a common plane, for contacting one face of a work-sheet at two laterally spaced locations, work-sheet gaging means located intermediate the two laterally spaced guiding surfaces and projecting a short distance across said plane from the side of the plane opposite to that from which the guiding surfaces are contacting said work-sheet, and deflecting means to bow the work-sheet over the projecting gaging means while the work-sheet is being moved toward said desired position with the said guiding surfaces active in guiding the work-sheet, said gaging means including a face whereagainst to gage the work-sheet in the desired position after moving it past the gaging means.

2. In a record preparing machine, means including two spaced channel formations to guide a work-sheet along two lateral, spaced ends in a common plane for movement to a desired position on the machine, work-sheet gaging means located intermediate the two spaced channel formations and projecting from one side across the said common plane, and deflecting means to bow a work-sheet past said projecting gaging means while the work-sheet is being moved toward said desired position with the lateral ends guided in said channels, said gaging means including a face whereagainst to back up and gage the work-sheet in the desired position after moving it past the gaging means.

3. In a record preparing machine, a platen, guiding means to present a work-sheet down the front of the platen and in a rearward sweep thereunder, comprising widely spaced members for guiding contact by the front-face of the work-sheet along its side margins, top-edge work-sheet gaging means intermediate said guide-members having support to the rear of said members and having a gaging face projecting forwardly thereof, and a downwardly and forwardly sloping sheet-deflecting face associated with said gaging means to cam or bow the work-sheet intermediate said members forwardly of said top-edge gage as it is being presented and guided down the front of the platen, said work-sheet being drawn upwardly against said gaging face after deflecting passage down past the front of said gaging means.

4. In a record preparing machine, a platen, guiding means to present a work-sheet down the front of the platen and in a rearward sweep thereunder, comprising widely spaced members for guiding contact by the front-face of the work-sheet along its side margins, top-edge work-sheet gaging means intermediate said guide-members having support to the rear of said members and having a gaging face projecting forwardly thereof and ending in a pronounced downward dip, and a downwardly and forwardly sloping sheet-deflecting face associated with said gaging means to cam or bow the work-sheet intermediate said members forwardly of said top-edge gage as it is being presented and guided down the front of the platen, said work-sheet being drawn upwardly against the rear of said gaging face after deflected passage down past the front of said gaging means, and forward flexure of the sheet intermediate said guiding members being prevented by the downward dip of the gaging face.

5. In a record preparing machine, a platen, means to present a work-sheet down the front of the platen and in a rearward sweep thereunder, comprising a front-feed structure displaceable from an out-of-way position above and to the rear of the front-face of the platen to a forward position facilitating front-feeding of the work-sheet, said structure including, two widely spaced means for guiding the work-sheet along its margins, and a top-edge work-sheet gage intermediate said guiding means, having support to the rear of said guiding means, and having underneath a gaging face projecting forwardly and ending in a pronounced downward dip at the front, said gage including a downwardly and forwardly sloping sheet-deflecting face to bow the work-sheet forwardly as such is front-fed to the platen, the work-sheet being front-fed past said top-edge gage and being backed up against said gaging face, said downward dip being instrumental to move and bend the work-sheet rearwardly as the front-feed structure is restored from forward position to its out-of-way position.

6. In a record preparing machine, a platen, front-feed means including two spaced means to guide a work-sheet along its margins in a defined plane, a flat-stock bar intermediate said two spaced means, rising contiguous to the rear of said plane above the platen, the bar being provided with a slot extending therealong, a top-edge gage supported on said bar to project forwardly across said plane and having walls facing the front and the two sides of the bar, an element reaching from the gage freely through the said slot in the bar and having an enlargement therebehind spaced from the bar, said element permitting the gage to be raised limitedly off the front of the bar, means to afford a toothed, releasable engagement of said gage with said bar in different locations therealong, and spring means having anchorage on said element and bearing on the back of said bar to press said gage resiliently, but releasably against the front side of the bar, providing thus for adjustment of the gage to different positions along said bar, said gage having a sheet-deflecting face sloping downwardly from the rear of said plane to the forward extremity of the gage.

WALTER A. ANDERSON.